(12) United States Patent
Rodgers et al.

(10) Patent No.: US 7,570,426 B2
(45) Date of Patent: Aug. 4, 2009

(54) APPARATUS AND SYSTEM FOR WIDE ANGLE NARROW-BAND OPTICAL DETECTION IN DAYLIGHT

(75) Inventors: Wayne Rodgers, Apple Valley, CA (US); Robert E. Erlandson, Columbia, MD (US); C. Bryon Hargis, Sykesville, MD (US); Neil Murphy, La Crescenta, CA (US)

(73) Assignees: The Johns Hopkins University, Baltimore, MD (US); The Eddy Company, Apple Valley, CA (US)

( * ) Notice: Subject to any disclaimer, the term of this patent is extended or adjusted under 35 U.S.C. 154(b) by 310 days.

(21) Appl. No.: 11/478,484

(22) Filed: Jun. 29, 2006

(65) Prior Publication Data

US 2007/0017281 A1  Jan. 25, 2007

Related U.S. Application Data

(60) Provisional application No. 60/695,274, filed on Jun. 30, 2005, provisional application No. 60/748,464, filed on Dec. 8, 2005.

(51) Int. Cl.
*G02B 27/28* (2006.01)
(52) U.S. Cl. ................ 359/501; 250/225; 356/437; 359/484
(58) Field of Classification Search ............ None
See application file for complete search history.

(56) References Cited

U.S. PATENT DOCUMENTS

| 4,435,041 A | 3/1984 | Torok et al. |
| 4,559,445 A | 12/1985 | Hedin et al. |
| 5,473,162 A | 12/1995 | Busch et al. |
| 5,502,558 A | 3/1996 | Menders |
| 5,731,585 A | 3/1998 | Menders et al. |
| 6,046,808 A | 4/2000 | Fateley |
| 6,128,078 A | 10/2000 | Fateley |
| 6,373,558 B1 * | 4/2002 | Hasson ............ 356/4.07 |
| 6,392,748 B1 | 5/2002 | Fateley |

(Continued)

OTHER PUBLICATIONS

Chen et al, "Sodium-vapor Dispersive Faraday Filter," Optics Letters, Jun. 15, 1993, pp. 1019-1021, vol. 18, No. 12, Optical Society of America.

(Continued)

*Primary Examiner*—Stephone B Allen
*Assistant Examiner*—Derek S Chapel
(74) *Attorney, Agent, or Firm*—Albert J. Fasulo, II (57) ABSTRACT

Techniques for filtering light include, along a central optical axis, an entrance window; a first polarizer, a narrowband polarization-changing material, a second polarizer, and an exit window. The optical paths through the filter are substantively unscattered and pass through unstressed components between the polarizers. The polarization-changing material changes polarization for a narrow wavelength band on the order of about $0.01 \times 10^{-9}$ meters and does not condense on optical windows and polarizers during the operational lifetime. An aspect ratio, defined by a distance from the entrance window to the exit window divided by an optical aperture for the entrance window, is less than 4/1. This filter thus transmits light substantively unattenuated in the narrow wavelength band up to a maximum acceptance angle greater than 5 degrees. Combined with optics and imaging detectors, it is suitable for wide area surveillance, including daylight surveillance for combustion like forest fire and missile plume.

23 Claims, 4 Drawing Sheets

U.S. PATENT DOCUMENTS

| | | | |
|---|---|---|---|
| 6,657,195 | B1 | 12/2003 | Martin et al. |
| 6,677,571 | B1 | 1/2004 | Clark et al. |
| 6,721,096 | B2 | 4/2004 | Bruzzone et al. |
| 6,943,868 | B2 | 9/2005 | Haig |
| 6,970,201 | B1 | 11/2005 | Neil |
| 6,978,064 | B2 | 12/2005 | Yoshida et al. |
| 6,985,658 | B2 | 1/2006 | Smaglinski |
| 7,045,783 | B2 * | 5/2006 | Matveev .................... 250/330 |
| 2005/0078729 | A1 | 4/2005 | Zhao |

OTHER PUBLICATIONS

Dick et al, "Ultrahigh-noise Rejection Optical Filter," Optics Letters, Jun. 1, 1991, pp. 867-869, vol. 16, No. 11, Optical Society of America.

Sakurai et al, "Construction of Long-life Magneto-optical Filters for Helioseismology Observations," unknown source, unknown publication date, but prior to Mar. 30, 2001.

Bythrow et al, "The Detection of Transient Optical Events at Narrowband Visible wavelength" APL Technical Digest, 1999, pp. 155-161, vol. 20, No. 2, The Johns Hopkins University Applied Physics Laboratory, US.

Gelbwachs, "Atomic Resonance Filters," IEEE Journal of Quantum Electronics, Jul. 1988, pp. 1266-1277, vol. 24, No. 7, IEEE.

H. Lin and J.R. Kuhn, An Imaging, Tunable Magneto-Optical Filter, Solar Physics 122: 365-380, 1989.

N. Murphy, E. Smith, W. Rodgers, S. Jefferies, Chromospheric Observations in the Helium 1083NM Line-A New Instrument, Proc. Solar Wind 11-SOHO 16, Jun. 12-17, 2005.

* cited by examiner

APPARATUS AND SYSTEM FOR WIDE ANGLE NARROW-BAND OPTICAL DETECTION IN DAYLIGHT

CROSS-REFERENCE TO RELATED APPLICATIONS

This application claims benefit of Provisional Appln. 60/695,274, filed Jun. 30, 2005, entitled "Narrow-Band Aircraft Missile Warning Sensor," the entire contents of which are hereby incorporated by reference as if fully set forth herein, under 35 U.S.C. §119(e).

This application also claims benefit of Provisional Appln. 60/748,464, filed Dec. 8, 2005, "Narrow-Band Aircraft Missile Warning Sensor," the entire contents of which are hereby incorporated by reference as if fully set forth herein, under 35 U.S.C. §119(e).

BACKGROUND OF THE INVENTION

1. Field of the Invention

The present invention relates to wide-angle narrowband optical filters with wavelength pass bands on the order of $0.01 \times 10^{-9}$ meters in the visible range, and in particular to filters with fields of view in excess of 14 degrees suitable for detecting from an aircraft optical emissions from combustion in the presence of daylight.

2. Description of the Related Art

Threats to human life and property are often harkened by combustion. For example, small fires in the wilderness can become forest fires that spread to populated areas. Anti-aircraft missiles sent aloft by burning rocket fuel when launched by terrorists or enemy combatants often target civilian and military aircraft. At night, such combustion sources are readily detected by the visible light emitted during combustion. During the daylight hours, however, the visible spectrum is deluged by daylight, including direct sunlight, sunlight scattered from the sky and clouds, or sunlight reflected from objects on the ground or in the air. The visible light from combustion is often masked by daylight.

It is common practice to use infrared (IR) detectors to detect thermal emission from heat sources at electromagnetic wavelengths long compared to those of visible light. As is well known, electromagnetic waves travel at the speed of light in a vacuum and encompass a wide spectrum of wavelengths, increasing from gamma rays to ultraviolet through the visible to the infrared and beyond to microwaves and radio waves. The optical spectrum visible to the human eye is associated with wavelengths from about 400 nanometers (nm, 1 $nm=10^{-9}$ meters), appearing violet to human observers, to about 750 nm, appearing red. Heat sources from a few hundred to several thousand degrees Kelvin emit light in the IR spectrum peak intensities between about 800 nm and about 20,000 nm.

The use of IR detectors in such applications is expensive. Thus few private and commercial vehicles or aircraft are equipped with IR detectors. In addition, processing IR images to determine what sources are of interest is complex and demands great processing power to reject clutter and various signatures that are not of interest. The cost of the powerful processors adds to the cost of a system based on an IR detector. The detectors and extensive processing lead to increased cost, size and weight of systems that rely on IR detectors.

An alternative approach is to detect optical emissions from the combustion process, rather than thermal emission. The optical emissions are narrow-band, are formed by atomic and molecular optical transitions excited as part of the combustion process and can occur throughout the optical spectrum. In addition, it is possible to select a combustion emission line that falls in a solar Fraunhofer absorption line. The Fraunhofer lines are narrow minima in the spectrum of light from the sun, produced by absorption of light in the cooler regions of the sun's outer atmosphere at wavelengths corresponding to the atomic and molecular transitions of materials in these regions. The light intensity within a Fraunhofer line is often only a few percent of the intensity outside the line, further increasing the contrast between combustion emission signal and ambient daylight. For example, Fraunhofer lines associated with Potassium absorption occurs at about 766.4 and 769.9 nm, have a width of about 0.02 nm, and have a central intensity about 80% lower than outside the lines. Events of interest often include combustion of trace amounts of Potassium which emits light at 766.4 nm and 769.9 nm. Therefore the combustion signal is high at the Fraunhofer wavelengths compared to sunlight, and combustion detection is more favorable at these wavelengths, among others.

To take advantage of this combustion signal, a narrowband optical filter is needed that stops sunlight in other bands and passes light in a band about 0.01 nm wide that overlaps the Potassium emissions at about 766.4 nm or 769.9 nm, or both.

As is well known, magneto-optical filters (MOF) are capable of filtering out light except in a narrow wavelength pass band. A MOF most often uses the properties of an alkali metal vapor in a magnetic field, which includes changing the polarization of light at a characteristic optical wavelength associated with transition energy for the metal. Other materials can also be used. When combined with a pair of polarizers oriented to block out light, only the light that has had its polarization changed in the metal vapor passes through the second polarizer. Therefore, only light at the transition energy wavelength passes through the filter.

Available MOF filters fall into two classes—cold cell and hot cell. The cold cell filters produce metal vapor by heating some central part of the cell and use a buffer gas to maintain a sufficient vapor population in the central part of the cell without allowing excessive diffusion of the vapor to the end windows. The hot cell filters heat the whole cell in an oven, using a cold finger to control vapor density. The cold-cell MOFs, have a limited field-of-view, are bulky and need continuous calibration to guarantee long-term stability. While prior implementations of the hot-cell, MOF can have a moderate field-of-view, they are difficult to construct in a way that minimizes polarization-inducing stresses in the cell windows and oven enclosure windows. Furthermore, the hot cell filters require bulky ovens to maintain cell temperature and control vapor density. Thus, conventional MOF implementations have a limited usefulness for monitoring large sections of earth or sky for fires, gunfire, missiles and other important combustion events. Especially on aircraft, the total volume and weight available for a combustion monitoring system, such as a missile warning system, is limited. A large array of narrow field of view cold cell MOFs, or hot-cell MOFs with bulky ovens are simply not feasible on an aircraft. Example aircraft constraints for a combustion monitoring system is a volume no larger than about 10 centimeters (cm, 1 $cm=10^{-2}$ meters) by 10 cm by 10 cm (i.e., a volume less than 1000 cubic cm) and a mass no greater than 1 kilogram (kg, 1 kg=1000 grams).

Based on the foregoing, there is a clear need for wide-field of view and short length MOFs without bulky ovens. In particular, there is a need for a low cost, small size, low weight MOF that has a field of view of more than 9 degrees about a central optical axis.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for narrowband wide-area optical filtering or detection of optical sources, or both, which do not suffer all the disadvantages of prior art approaches. These techniques allow the filter to be contained effectively within a compact wide angle (up to or greater than 100°) imaging system.

In one set of embodiments, a filter includes an optical entrance window, a first polarizer, a second polarizer, a narrowband polarization-changing material and an optical exit window. The optical entrance window admits light to the filter. The first polarizer induce a first polarization state of light transmitted through the first polarizer and is separated a first distance no less than zero from the optical entrance window along a central optical axis. The second polarizer is oriented to substantively block light having the first polarization state. The second polarizer is separated a second distance, greater than the first distance, from the optical entrance window along the central optical axis. The narrowband polarization-changing material is disposed between the first polarizer and the second polarizer. The optical exit window transmits light away from the second polarizer and is separated a third distance, no less than the second distance, from the optical entrance window along the central optical axis. The polarization-changing material changes polarization for a narrow wavelength band width on the order of about $0.01 \times 10^{-9}$ meters; and does not condense on optical windows and polarizers during the operational lifetime for the apparatus. No optical window between the first polarizer and second polarizer is subject to a polarization-inducing stress. A negligible portion of light transiting the apparatus incident at an incident direction less than a maximum acceptance angle from the central axis is scattered into a different direction. An aspect ratio is less than 4/1; where the aspect ratio is defined by a distance from the optical entrance window to the optical exit window divided by an optical aperture for the optical entrance window.

As a consequence of this arrangement, the filter transmits light in the narrow wavelength band over a range of directions up to the maximum acceptance angle around the central axis. A tangent of the maximum acceptance angle is equal to half of a reciprocal of the aspect ratio; thus, the maximum acceptance angle is greater than 7 degrees, and a field of view is greater than 14 degrees.

In some of these embodiments, the polarization-changing material is a metal vapor that rotates polarized light in the narrow wavelength band when subjected to a magnetic field. A heater is included to heat a particular component that contacts the metal vapor to prevent condensation of metal from the metal vapor onto the particular component.

In some of these embodiments, an inner chamber of walls that encloses the metal vapor is included. The walls of the inner chamber include a first inner optical window and a second inner optical window. The first inner optical window admits polarized light transmitted through the first polarizer; and the second inner optical window transmits light to impinge on the second polarizer. The heater is configured to heat the first inner optical window and the second inner optical window to prevent condensation of metal from the metal vapor onto the first inner optical window and the second inner optical window.

In some of these embodiments, a vacuum chamber is included that encloses the first polarizer and the second polarizer and the inner chamber. The optical entrance window forms a portion of a wall of the vacuum chamber. A vacuum pressure in the vacuum chamber is selected so that convective heat loss from the inner chamber is sufficiently low that metal does not condense from the metal vapor onto the first inner optical window and the second inner optical window.

In another set of embodiments, a system for detecting combustion sources in daylight includes a wide field-of-view, narrowband magneto-optical filter (MOF), an optical coupler, a light imaging detector and a processor. The wide field-of-view narrowband MOF includes an entrance window, a first polarizer, a second polarizer, a polarization-changing material, and an exit window. The entrance window admits light to the filter. The first polarizer induces a first polarization state of light transmitted through the first polarizer and is separated a first distance from the optical window along a central optical axis. The second polarizer is oriented to substantively block light having the first polarization state; and is separated a second distance, greater than the first distance, from the optical window along the central optical axis direction. The narrowband polarization-changing material is disposed between the first and second optical polarizers. The optical exit window transmits light out of the filter and is separated a third distance, no less than the second distance, from the optical window along the central optical axis. The optical coupler is configured to direct light into the optical entrance window of the filter from a surveillance area where combustion detection is desirable. The light imaging detector is configured to receive light from the optical exit window of the filter and produce image data. The data processor is configured to process image data from the light imaging detector to determine where combustion is evident in the surveillance area. The material changes polarization for a narrow wavelength band width on the order of about $0.01 \times 10^{-9}$ meters that overlaps an optical wavelength associated with a local minimum in intensity of a daylight spectrum and overlaps an optical wavelength associated with a relatively high intensity in a combustion spectrum. An aspect ratio, defined by a distance from the optical entrance window to the optical exit window divided by an optical aperture for the optical entrance window, is less than 4/1. The light imaging detector produces an image of a simultaneous field-of-view that has a size in a range from about 14 degrees to about 100 degrees

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and system are described for wide-view narrowband filtering and detection of optical sources. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are descried below in the context of a Potassium vapor MOF in a vapor chamber enclosed in a vacuum chamber with heaters to avoid condensation in a filter having an optical aspect ratio of 4 to 1 or less. However, the invention is not limited to this context. In other embodiments, other materials, both in vapor and non-vapor states, serve to change polarization between the two polarizers, for a narrow wavelength band on the order of 0.01 nm, allow for unscattered transect of light in multiple directions, and still maintain an aspect ratio of 4:1 or less to support wide field-of-view imaging, compared to conventional filters. For example, it is anticipated that other alkali metal vapors are used in various embodiments; especially vapors of those metals that emit light during combustion at wavelengths that align with Fraunhofer lines. As used herein, optical refers to electromagnetic waves in the ultraviolet, visible, near infrared (NIR) and short wavelength infrared.

1. Operation of Conventional MOF Filters

Figure 1:
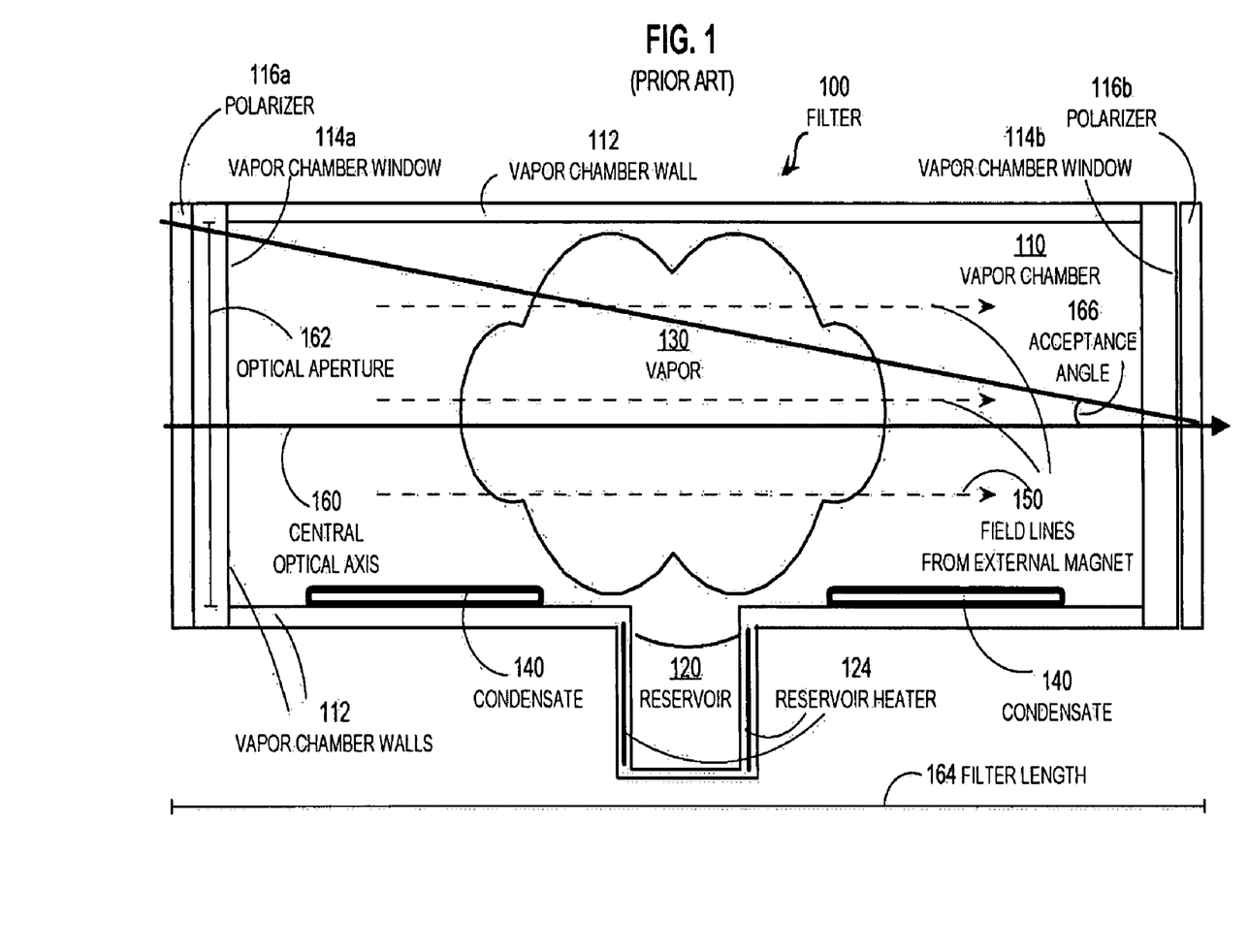
FIG. 1 is a block diagram that illustrates a magneto-optical filter (MOF) in the prior art.

FIG. 1 is a block diagram that illustrates a magneto-optical filter (MOF) 100, according to the prior art. MOF filter 100 includes a vapor chamber 110 and two polarizers 116a, 116b (collectively referenced hereinafter as polarizers 116). The first polarizer 116a transmits light having a particular linear polarization. The second polarizer 116b transmits light having an electric field orientation that is substantively orthogonal to the particular linear polarization. In the absence of a polarization changing medium between the two polarizers, light that passes through the first polarizer 116 is substantially blocked by the second polarizer 116b. In practice, light blockage is effective down to one part in a hundred thousand (e.g., transmittance is about $10^{-5}$) using the orthogonal polarizers 116.

The vapor chamber 110 includes vapor chamber walls 112 to encompass the vapor, a reservoir 120 of the material in solid or liquid state, a heater 124 to energize the reservoir material into the vapor state. Optically transparent vapor chamber windows 114a, 114b (collectively referenced hereinafter as vapor chamber windows 114) compose part of the vapor chamber walls 112. A first vapor chamber window 114a admits light that passes through the first polarizer 116a without changing its polarization state. A second vapor chamber window 114b transmits light that subsequently passes through the second polarizer 116b, again without changing its polarization state. A central optical axis 160 is a line segment through the middle of the polarizers 116 and vapor chamber windows 114.

During operation of the filter 100, an external magnet (not shown) introduces a magnetic field in the vapor chamber 110, for example, as indicated by the field lines 150 from the external magnet in FIG. 1. Other orientations of magnetic fields are also possible. The heater 124 is operated to produce a vapor 130 that fills a central section of the vapor chamber 110. The vapor chamber usually also contains a buffer gas to limit the transport of the vapor to the optical windows 114. When polarized light passes from polarizer 116a through the vapor 130 in the presence of the magnetic field represented by field lines 150, the polarization is rotated to include some orthogonal components for wavelengths near a transition wavelength of the material in the vapor. The orthogonal components pass unblocked through the second polarizer 114g. No other wavelengths are rotated. The un-rotated wavelengths are substantively blocked by the second polarizer 116b, e.g., attenuated to a factor of about $10^{-5}$. The magnetic field and vapor density determine the shape of the pass band, e.g., the central wavelength, the level of transmittance at the central wavelength, and the wavelength width of the pass band, such as full width at half maximum (FWHM) transmittance.

As the heated vapor 130 cools away from the center section, material condenses from the vapor 130 onto the inside vapor chamber walls 112 and forms a condensate layer 140. In general, the condensate layer is opaque to light. To prevent the condensate layer 140 from forming on the transparent vapor channel windows 114, the vapor channel length is extended so that the condensate layer 140 forms for the most part on non-transparent walls of the vapor channel walls 112. Eventually, condensate does form on one or both of the vapor channel windows 114, rendering the filter inoperative.

The field of view is determined by the optical aspect ratio of the filter 100. The optical aspect ratio is defined herein as the quotient of the length of the filter, indicated by the filter length 164 in FIG. 1, and the optical aperture of the first vapor chamber window 114a, indicated by the optical aperture 162 in FIG. 1. Light traveling in the direction of the central optical axis 160 and light traveling in directions up to a maximum acceptance angle 166 pass through the filter 100 and are available for imaging. The tangent of the acceptance angle 166 is given by half the optical aperture 162 divided by the filter length 164. Thus the tangent of the acceptance angle is given by half of the reciprocal of the aspect ratio. The field of view is any area that transects a three dimensional cone that has an apex at the outside of the second polarizer 116b and is formed by rotating the acceptance angle 166 around the central optical axis 160. In the following, the field of view is expressed as twice the acceptance angle, but is understood to be a three dimensional cone.

Because of condensation, the vapor chamber 110 is typically long compared to the optical aperture 162. In some conventional MOFs, the vapor chamber length, and hence the filter length 164, is on the order of 5 inches (1 inch=2.54 cm) or more, while the optical aperture 162 is on the order of 0.8 inch or less. This leads to an aspect ratio of 6.25 to 1 (expressed as 6.25:1) or more. The corresponding acceptance angle 166 is less than 4.6 degrees. The field of view is less than 9.2 degrees. An optical system using such a filter would have a length increased to accommodate the 5 inch vapor chamber

2. A Wide Field-of-View MOF

Figure 2:
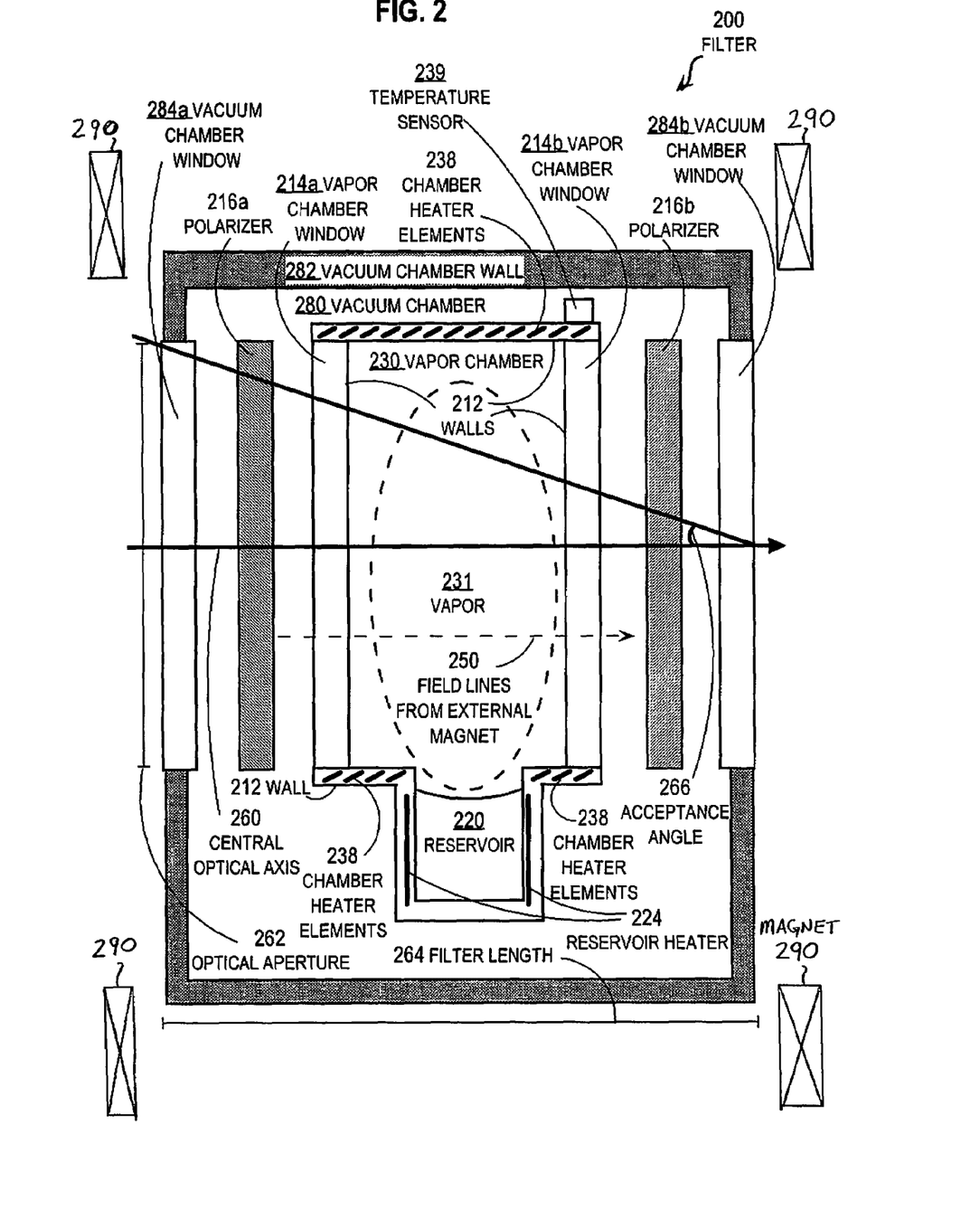
FIG. 2 is a block diagram that illustrates a wide field-of-view MOF, according to an embodiment.

According to various embodiments, a wide field-of-view, narrowband filter has an aspect ratio less than 4:1. FIG. 2 is a block diagram that illustrates a wide field-of-view MOF 200, according to an embodiment. Filter 200 has filter length 264 and optical aperture 262 that produce an optical aspect ratio of 4:1 or less.

In the illustrated embodiment, filter 200 includes a vapor chamber 230, a first polarizer 216a, a second polarizer 216b and a vacuum chamber 280. In some embodiments, the vacuum chamber 280 is omitted. In some embodiments, a material other than a vapor is used as the polarization-changing material and vapor chamber 230 is modified or omitted. Field lines 250 are produced by an external magnet 290.

In the illustrated embodiment, vapor chamber 230 includes vapor chamber walls 212 to encompass the vapor, a reservoir 220 of the material in solid or liquid state, and a heater 224 to energize the reservoir material into the vapor state 231. One wall 212 includes a first vapor chamber window 214a and another wall 212 includes a second vapor chamber window 214b (collectively referenced hereinafter as vapor chamber windows 214) which are transparent at optical wavelengths. A first vapor chamber window 214a admits light that passes through the first polarizer 216a. A second vapor chamber window 214b transmits light that subsequently passes through the second polarizer 216b. A central optical axis 260 is a line segment through the middle of the polarizers 216 and vapor chamber windows 214.

To ensure a small aspect ratio for the filter 200, the vapor chamber 230, itself, has a small aspect ratio. For example, in an example vapor chamber for Potassium, the aspect ratio on the order of one, well below the aspect ratio of 5:1 in conventional cold cell MOFs.

In the illustrated embodiment, the vapor chamber 230 includes chamber heater elements 238 and temperature sensor 239. The heater elements 238 are configured to prevent condensation on vapor chamber windows 214. In some embodiments, heater elements 238 are embedded in any wall 212, including the transparent vapor chamber windows 280. The elements 238 in the windows 214 can reduce transmission, through the filter, of light at the pass band wavelengths. In the illustrated embodiment, the heater elements 238 are embedded only in side walls of chamber walls 212, excluding the vapor chamber windows 214. In the illustrated embodiment, the vapor chamber windows 214 become heated by conduction from the heater elements 238 in the side walls of the chamber walls 212. The combined effects of heater 214 and heater elements 238 affect the density of the vapor, and thus fine tune the filter wavelength characteristics.

The amount of heat produced by the chamber heater elements 238 to prevent condensation on the windows 214 depends on the size of the chamber 230, the material of the chamber walls 212, the material of the vapor 231, and the atmosphere around the vapor chamber 230. The amount for a particular application can be determined readily by experimentation and monitored during operation using temperature sensor 239. For example, in a vapor chamber for Potassium, with the dimensions described above, made of glass with windows of glass, in a low pressure vacuum, a temperature sensor 239 temperature of 120 degrees Celsius is sufficient to avoid condensation on the windows 214. Thus, unlike a conventional cold cell MOF, filter 200 shows no condensation layer in the vapor chamber 230. Unlike a hot cell MOF, a bulky external oven is not needed. Condensation may occur in some embodiments on the side walls 212, excluding the vapor chamber windows 214. Without heater elements 238, Potassium condenses from Potassium vapor onto the windows 214 in a matter of minutes, and renders the filter inoperative. With heater elements 238, condensation can be avoided for hundreds to thousands to tens of thousands of hours, extending the operational lifetime of the filter.

Figure 4:
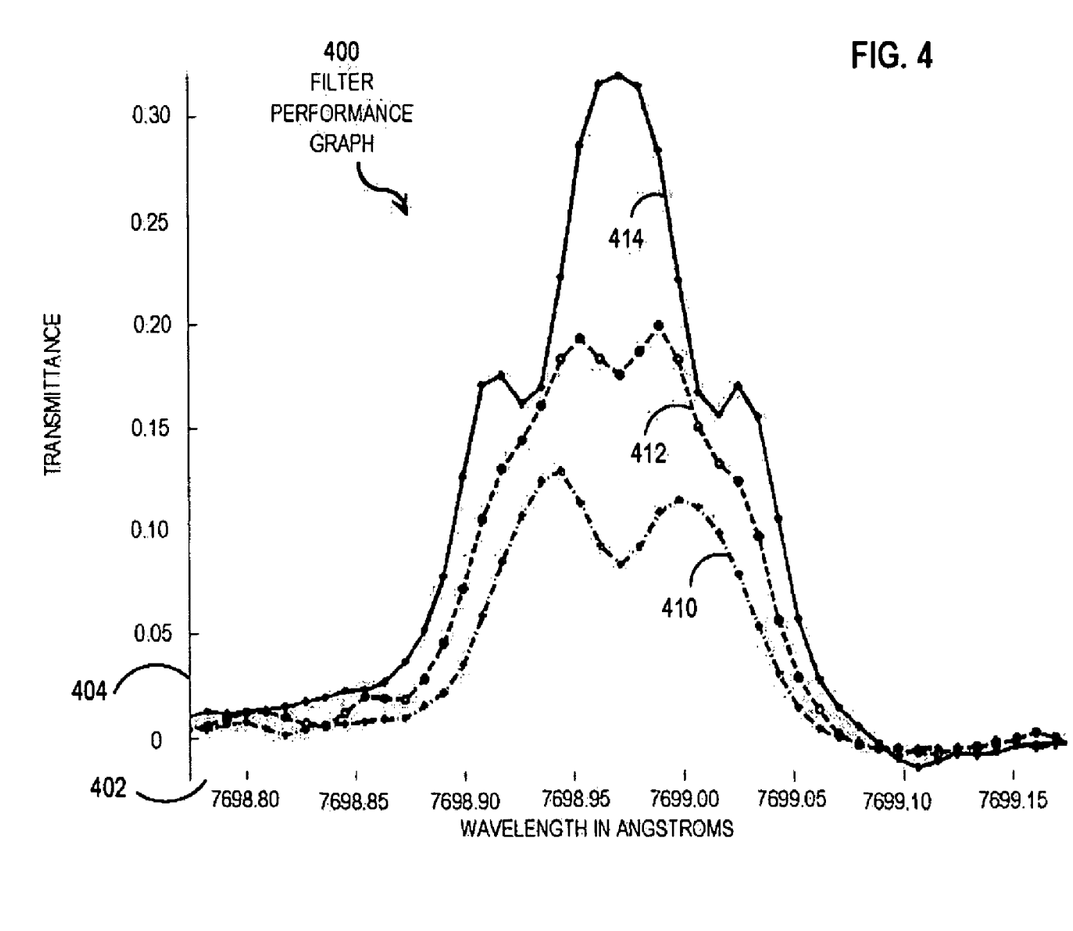
FIG. 4 is a graph that illustrates MOF performance for a particular metal vapor at several temperatures, according to an embodiment.

FIG. 4 is a graph 400 that illustrates MOF performance for a particular metal vapor at several reservoir temperatures, according to an embodiment. Horizontal axis 402 indicates wavelength of light incident through the first polarizer 216a in Angstroms (1 Angstrom=0.1 nm). Vertical axis 404 indicates transmittance through the second polarizer 216b in fraction of incident optical intensity. A transmittance of 0 indicates complete blockage and a transmittance of 1 indicates complete transmission with no loss of optical energy. The metal vapor is Potassium.

Graph 400 includes three traces 410, 412, 414. Trace 410 indicates the shape of the filter response at a first reservoir temperature. Trace 412 indicates the shape of the filter response at a second reservoir temperature. Trace 414 indicates the shape of the filter response at a third reservoir temperature, e.g., 120 degrees Celsius. The graph shows best filter performance at 120 degrees Celsius. Transmittance is greater than 30%, with a FWHM of about 0.15 Angstroms=0.015 nm. This is suitable for detection of narrow-band optical emissions from combustion and also coincides with a solar Fraunhofer line. A second pass band for Potassium, near 766.4 nm, is not shown.

In the illustrated embodiment, filter 200 includes vacuum chamber 280. Vacuum chamber 280 includes vacuum chamber walls 282 to encompass the vacuum. One wall 282 includes a first vacuum chamber window 284a and another wall 282 includes a second vacuum chamber window 284b (collectively referenced hereinafter as vacuum chamber windows 284) which are transparent at optical wavelengths. A first vacuum chamber window 284a admits light that passes through the first polarizer 216a. A second vapor chamber window 284b transmits light that passes through the second polarizer 216b.

The vacuum in vacuum chamber 280 is chosen to reduce or eliminate heat loss from vapor chamber windows 214 via convection in an atmosphere surrounding vapor chamber 230. An effective level of vacuum is easily determined by experimentation. For a Potassium vapor chamber, a vacuum of less than about 10 Torr (1 Torr=133.3 Newtons/meter$^2$, and 1 Torr is about one thousandth of atmospheric pressure) is sufficient to reduce convective heat loss that allows condensate to form on windows 214. In an example embodiment, a vacuum of less than 0.001 Torr was implemented.

By reducing or eliminating convective heat loss, the amount of energy supplied to heater elements 238 to prevent condensation on vapor chamber windows 214 is also reduced. Furthermore, the temperature of the vapor chamber walls can be reduced while preventing condensation. This has the further advantage of avoiding high temperatures that can degrade the structural integrity of the chamber and the bonds, such as epoxy, that fix the glass and walls to each other. This also reduces temperature cycling that can lead to mechanical degradation.

To ensure a small aspect ratio for the filter 200, the vacuum chamber 280, itself, has a small aspect ratio. For example, in an example vacuum chamber for Potassium, the vacuum chamber 280 is 2.3 cm in length and has an optical clear aperture of 2.2 cm in diameter, for an aspect ratio on the order of 1.05:1, well below the aspect ratio of 5:1 in conventional cold cell MOFs. The aspect ratio 1.05:1 corresponds to a maximum acceptance angle of about 25.5 degrees and a field of view of about 51 degrees. Thus, an embodiment dimensioned to have an aspect ratio less than or equal to 2:1 yields a field of view sufficiently wide to maintain the advantages of the present invention.

In the illustrated embodiment, the polarizers 216 are inside vacuum chamber 280. In other embodiments, one or both polarizers 216 are outside vacuum chamber 280. When a polarizer is outside the vacuum chamber, the filter length 262 extends to encompass the external polarizer; and the external polarizer is considered the optical entrance or exit window for the filter.

An advantage of placing the polarizers 216 inside the vacuum chamber 280 is that the filter is less subject to stresses that can degrade the purity of the polarized light produced. For example, vacuum chamber window 284 is subject to stress in response to the pressure difference between the inside and outside of vacuum chamber 280. Such stress gradually degrades the purity of polarized light passed by the window 284a and can introduce orthogonal components at wavelengths other than the metal vapor transition wavelength to polarized light passed from an external polarizer. By placing the polarizers 116 inside the vacuum chamber 280, the spurious polarization produced by window 284a are blocked by the first polarizer and spurious polarization components introduced by the exit window 284b do not affect filter performance.

As described above, FIG. 2 shows a cross section of illustrated components in a vertical plane. In a perpendicular plane the components may have any suitable shape, such as a rectangle, a square, an oval or some other shape. For purposes of illustration, it is assumed that the shape of illustrated components in FIG. 2 in a perpendicular plane is circular, with a center at the central optical axis 260, except for reservoir 220 and temperature sensor 239.

In an example embodiment, the filter 200 occupies a space less than 4 cm by 4 cm by 4 cm=64 cubic centimeters and has a mass of 0.37 kg, sufficiently small to fit within the space and mass constraints of aircraft, even with additional components, as described next.

3. A Combustion Warning System

Figure 3:
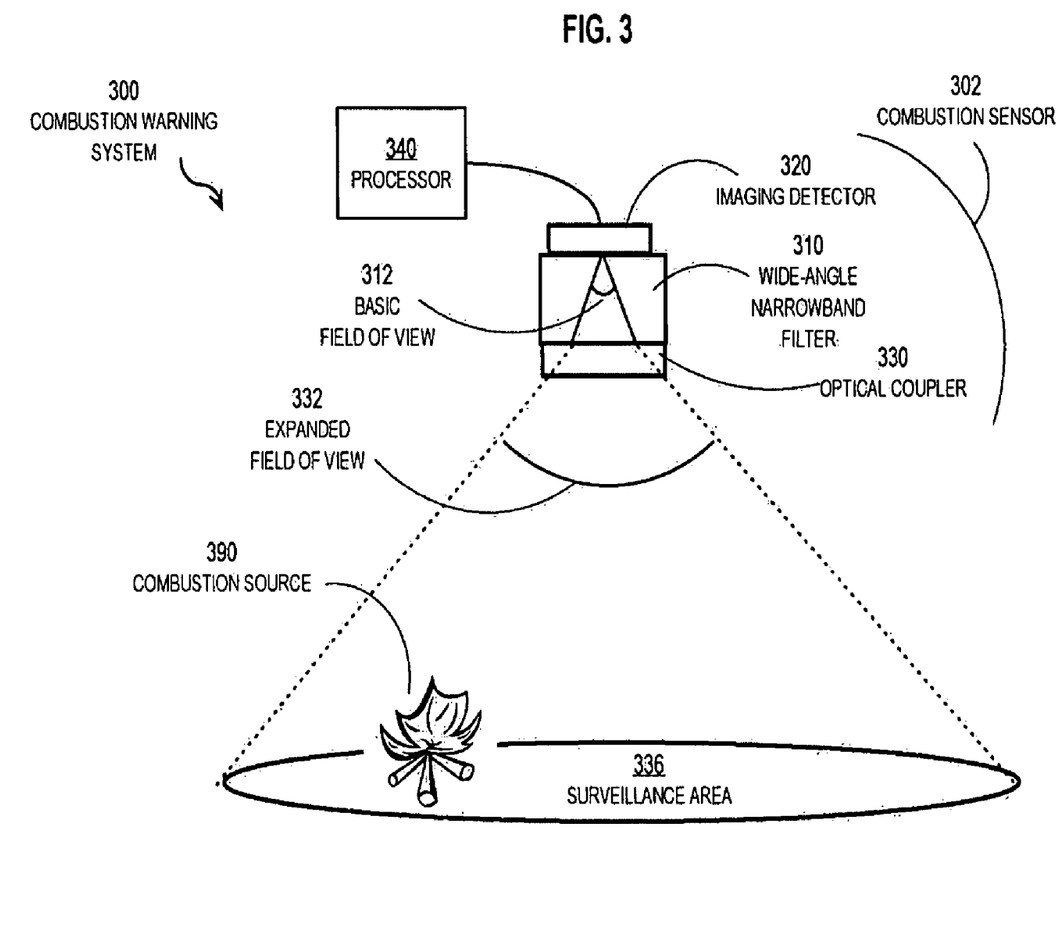
FIG. 3 is a block diagram that illustrates a warning system that uses the wide field-of-view MOF, according to an embodiment.

FIG. 3 is a block diagram that illustrates a warning system 300 that uses the wide field-of-view MOF, according to an embodiment. The system includes a combustion sensor 302 and a processor 340. The combustion sensor 302 includes a wide-angel, narrowband filter 310, an optical coupler 330, and imaging detector 320.

The wide-angle narrowband filter 310 is an embodiment of filter 200 in which the metal vapor chosen for vapor 231 matches the metal in a combustion target and also coincides with a minimum in the daylight absorption spectrum, so as to fall in a Fraunhofer line. The basic field of view of the filter 312 is given by twice the acceptance angle and is determined by the optical aspect ratio of the filter. For the example Potassium vapor chamber filter, described above, with an aspect ratio of 1.05:1, the basic field of view 312 is 51 degrees.

The combustion sensor 302 includes an optical coupler 330 to direct higher angles into the filter. The effect of directing higher angles into the filter is to expand the field of view beyond that of the basic field of view. The large basic field-of-view of the filter allows the coupling optics to be compact and have sufficient effective aperture while achieving a wide expanded field-of-view. It is assumed for purposes of illustration that the optical coupler directs light incident at 50 degrees into an angle of 25.5 degrees at the optical entrance window 284a and has an effective aperture of 1.4 cm. Since the 25.5 degrees is within the maximum acceptance angle of the example embodiment, the light is accepted and emitted at the exit window 284b if not blocked by the second polarizer 216b. The expanded field of view is then 100 degrees, represented by the expanded field of view 332 in FIG. 3. It is assumed for purposes of illustration, that the expanded field of view intersects a flat ground as surveillance area 336.

In some embodiments, optical coupler 330 includes a pre-filter to filter out one or more of two or more transition wavelengths passed by the filter 310. For example, a Potassium vapor filter passes wavelengths near 766.4 nm and near 769.9 nm. A pre-filter can be used, for example, to filter out a large band of wavelengths that include the 766.4 wavelength. With such a pre-filer, the filter 310 passes only a single or reduced number of wavelength bands.

The sensor 302 also includes an imaging detector 320. The imaging detector 320 produces image data (an array of picture elements called pixels) from light focused at the optical exit window 284b of filter 310. The imaging detector 320 typically includes a lens and an array of photo-detectors, such as a charge coupled device (CCD) array. Imaging detectors are well known in the art and include digital cameras.

The pixel data is fed to a processor 340 where detection algorithms are executed for each pixel or group of pixels. The algorithms are implemented as hardware or software or some combination. Detection algorithms are well known in the art. The orientation and altitude of the combustion sensor 302 is used by processor 340 to associate pixels in the image data with a direction from the combustion sensor 302. For example, the processor 340 determines that one or more pixels associated with a particular direction show substantial transmission at Potassium transition wavelength 789.9 nm, indicating combustion in that direction, even in daylight. The processor 340 then deduces that combustion is occurring at the combustion source 390 location within the surveillance area 336.

While forest fires that persist while an aircraft flies over are relatively easy to detect even with a less wide field of view detector, gun fire or a missile launched at the aircraft is transient, and the odds of detecting either are directly proportional to the surveillance area monitored at one time by the combustion sensor 302. Thus system 300 is especially useful for the detection of gun fire and missile launches before the aircraft is struck, thus warning the aircraft operator in time to take evasive action or engage self-protection systems.

4. Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for wide-angle narrowband filtering of optical energy comprising:
   an optical entrance window for admitting light to the apparatus;
   a first polarizer to determine a first polarization state of light transmitted through the first polarizer and separated a first distance no less than zero from the optical entrance window along a central optical axis;
   a second polarizer oriented to substantively block light having the first polarization state and separated a second distance, greater than the first distance, from the optical entrance window along the central optical axis;
   a narrowband polarization-changing material disposed between the first polarizer and the second polarizer; and
   an optical exit window for transmitting light away from the second polarizer separated a third distance, no less than the second distance, from the optical entrance window along the central optical axis;
   wherein
      the polarization-changing material changes polarization for a narrow wavelength band width on the order of about $0.01 \times 10^{-9}$ meters;

the polarization-changing material does not condense on optical windows and polarizers during an operational lifetime for the apparatus;

no optical window between the first polarizer and second polarizer is subject to a polarization-inducing stress;

a negligible portion of light transiting the apparatus incident at an incident direction less than a maximum acceptance angle from the central axis is scattered into a different direction; and an aspect ratio, defined by a distance from the optical entrance window to the optical exit window divided by an optical aperture for the optical entrance window, is less than 4/1, whereby the apparatus transmits light in the narrow wavelength range in each of a plurality of directions up to the maximum acceptance angle around the central axis and a tangent of the maximum acceptance angle is equal to half of a reciprocal of the aspect ratio and the maximum acceptance angle is greater than 7 degrees; and wherein:

the polarization-changing material is a metal vapor that rotates polarized light in the narrow wavelength band when subjected to a magnetic field; and the apparatus further comprises a magnet to produce the magnetic field; and a heater to heat a particular component that contacts the metal vapor to prevent condensation of metal from the metal vapor onto the particular component;

wherein:

the apparatus further comprises an inner chamber of walls that encloses the metal vapor, the walls of the inner chamber include a first inner optical window and a second inner optical window;

the first inner optical window admits polarized light transmitted through the first polarizer;

the second inner optical window transmits light to impinge on the second polarizer; and the heater is configured to heat the first inner optical window and the second inner optical window to prevent condensation of metal from the metal vapor onto the first inner optical window and the second inner optical window;

wherein:

the apparatus further comprises a vacuum chamber that encloses the inner chamber and the first polarizer;

the optical entrance window forms a portion of a wall of the vacuum chamber; and a vacuum pressure in the vacuum is selected so that connective heat loss from the inner chamber is sufficiently low that metal does not condense from the metal vapor onto the first inner optical window and the second inner optical window; and wherein:

the first polarizer is located inside the vacuum chamber, blocking from the inner chamber first inner optical window spurious polarization introduced into the light admitted by the optical entrance window by a stress on the optical entrance window that results from a pressure difference between the vacuum pressure in the vacuum chamber and a pressure outside the vacuum chamber.

2. An apparatus as recited in claim 1, wherein the apparatus further comprises a light imaging detector separated a fourth distance, not less than the third distance, from the optical window along the optical axis direction.

3. An apparatus as recited in claim 2, wherein the optical exit window is an aperture of the light imaging detector, whereby the fourth distance equals the third distance.

4. An apparatus as recited in claim 2, wherein the operational lifetime of the apparatus is more than 100 hours.

5. An apparatus as recited in claim 2, wherein light is sufficiently unattenuated inside the apparatus, so that the light imaging detector detects signals of interest within the narrow wavelength band width.

6. An apparatus as recited in claim 2, wherein light is sufficiently unscattered inside the apparatus, so that the light imaging detector produces an image of light received through the optical entrance window within a basic field of view defined by the maximum acceptance angle rotated around the central optical axis, whereby the basic field of view of the apparatus is a cone having an apex at the optical exit window and an angle of more than 14 degrees.

7. An apparatus as recited in claim 6, further comprising a lens to reduce an arrival angle of light into the basic field of view, whereby an apparatus field of view is greater than the basic field of view.

8. An apparatus as recited in claim 7, wherein the lens collects sufficient light within the narrow wavelength band for combustion to be detected by the light imaging detector.

9. An apparatus as recited in claim 1, wherein the vacuum chamber encloses both the first polarizer and the second polarizer.

10. An apparatus as recited in claim 1, wherein the apparatus has a volume that is not greater than 1000 cubic centimeters.

11. An apparatus as recited in claim 1, wherein the apparatus has a mass that is not greater than one kilogram.

12. An apparatus as recited in claim 1, wherein the narrow wavelength band width overlaps an optical wavelength associated with a local minimum in intensity of a daylight spectrum.

13. An apparatus as recited in claim 12, wherein the optical wavelength associated with the local minimum in intensity of the daylight spectrum corresponds to a solar Fraunhofer absorption line.

14. An apparatus as recited in claim 1, wherein the narrow wavelength band width overlaps an optical wavelength associated with a relatively high intensity in a combustion spectrum.

15. An apparatus as recited in claim 14, wherein the narrow wavelength band width overlaps an optical wavelength associated with a relatively high intensity in a combustion spectrum of potassium.

16. An apparatus as recited in claim 14, wherein the narrow wavelength band width overlaps optical emissions from combustion of a metal coinciding with at least one Fraunhofer line.

17. An apparatus as recited in claim 1, wherein the polarization-changing material is a Potassium vapor.

18. An apparatus as recited in claim 1, wherein the first polarizer and the second polarizer are subjected to mechanical stress less than a stress threshold above which polarization state of light induced by a polarizer changes over the operational lifetime for the apparatus.

19. An apparatus as recited in claim 1, wherein the first polarizer is the same as the optical entrance window.

20. An apparatus as recited in claim 1, wherein the second polarizer is the same as the optical exit window.

21. An apparatus for wide-angle narrowband filtering of optical energy comprising:

an optical entrance window for admitting light to the apparatus;

a first polarizer to determine a first polarization state of light transmitted through the first polarizer and separated a first distance no less than zero from the optical entrance window along a central optical axis;

a second polarizer oriented to substantively block light having the first polarization state and separated a second distance, greater than the first distance, from the optical entrance window along the central optical axis;

a narrowband polarization-changing material disposed between the first polarizer and the second polarizer; and an optical exit window for transmitting light away from the second polarizer separated a third distance, no less than the second distance, from the optical entrance window along the central optical axis;

wherein
the polarization-changing material changes polarization for a narrow wavelength band width on the order of about $0.01 \times 10^{-9}$ meters;

the polarization-changing material does not condense on optical windows and polarizers during an operational lifetime for the apparatus;

no optical window between the first polarizer and second polarizer is subject to a polarization-inducing stress;

a negligible portion of light transiting the apparatus incident at an incident direction less than a maximum acceptance angle from the central axis is scattered into a different direction; and an aspect ratio, defined by a distance from the optical entrance window to the optical exit window divided by an optical aperture for the optical entrance window, is less than or equal to 2/1, whereby the apparatus transmits light in the narrow wavelength range in each of a plurality of directions up to the maximum acceptance angle around the central axis and a tangent of the maximum acceptance angle is equal to half of a reciprocal of the aspect ratio and the maximum acceptance angle is greater than or equal to 4 degrees; and wherein:
the polarization-changing material is a metal vapor that rotates polarized light in the narrow wavelength band when subjected to a magnetic field; and
the apparatus further comprises
a magnet to produce the magnetic field; and
a heater to heat a particular component that contacts the metal vapor to prevent condensation of metal from the metal vapor onto the particular component;

wherein:
the apparatus further comprises an inner chamber of walls that encloses the metal vapor,
the walls of the inner chamber include a first inner optical window and a second inner optical window;
the first inner optical window admits polarized light transmitted through the first polarizer;
the second inner optical window transmits light to impinge on the second polarizer; and
the heater is configured to heat the first inner optical window and the second inner optical window to prevent condensation of metal from the metal vapor onto the first inner optical window and the second inner optical window;

wherein:
the apparatus further comprises a vacuum chamber that encloses the inner chamber and the first polarizer;
the optical entrance window forms a portion of a wall of the vacuum chamber; and a vacuum pressure in the vacuum is selected so that convective heat loss from the inner chamber is sufficiently low that metal does not condense from the metal vapor onto the first inner optical window and the second inner optical window; and wherein:
the first polarizer is located inside the vacuum chamber. blocking from the inner chamber first inner optical window spurious polarization introduced into the light admitted by the optical entrance window by a stress on the optical entrance window that results from a pressure difference between the vacuum pressure in the vacuum chamber and a pressure outside the vacuum chamber.

22. A system for detecting combustion sources in daylight, comprising:
a wide field-of-view narrowband magneto-optic filter comprising:
an optical entrance window for admitting light to the filter;
a first polarizer to induce a first polarization state of light transmitted through the first polarizer and separated a first distance from the optical window along a central optical axis;
a second polarizer oriented to substantively block light having the first polarization state and separated a second distance, greater than the first distance, from the optical window along the central optical axis direction;
a narrowband polarization-changing material disposed between the first and second optical polarizers; and
an optical exit window for transmitting light out of the filter separated a third distance, greater than the second distance, from the optical window along the central optical axis;

an optical coupler configured to direct light into the optical entrance window of the filter from a surveillance area where combustion detection is desirable;

a light imaging detector configured to receive light from the optical exit window of the filter and produce image data; and a data processor to process image data from the light imaging detector to determine where combustion is evident in the surveillance area;

wherein
the material changes polarization for a narrow wavelength band width on the order of about $0.01 \times 10^{-9}$ meters that overlaps an optical wavelength associated with a local minimum in intensity of a daylight spectrum and overlaps an optical wavelength associated with a relatively high intensity in a combustion spectrum;

no optical window between the first polarizer and second polarizer is subject to a polarization-inducing stress;

an aspect ratio, defined by a distance from the optical entrance window to the optical exit window divided by an optical aperture for the optical entrance window, is less than 4/1; and the light imaging detector produces an image of an simultaneous field of view that has a size in a range from about 14 degrees to about 100 degrees;and wherein:
the polarization-changing material is a metal vapor that rotates polarized light in the narrow wavelength band when subjected to a magnetic field; and
the apparatus further comprises
a magnet to produce the magnetic field; and a heater to heat a particular component that contacts the metal vapor to prevent condensation of metal from the metal vapor onto the particular component;

wherein:

the apparatus further comprises an inner chamber of walls that encloses the metal vapor, the walls of the inner chamber include a first inner optical window and a second inner optical window;

the first inner optical window admits polarized light transmitted through the first polarizer;

the second inner optical window transmits light to impinge on the second polarizer; and the heater is configured to heat the first inner optical window and the second inner optical window to prevent condensation of metal from the metal vapor onto the first inner optical window and the second inner optical window;

wherein:

the apparatus further comprises a vacuum chamber that encloses the inner chamber and the first polarizer;

the optical entrance window forms a portion of a wall of the vacuum chamber; and a vacuum pressure in the vacuum is selected so that convective heat loss from the inner chamber is sufficiently low that metal does not condense from the metal vapor onto the first inner optical window and the second inner optical window; and wherein:

the first polarizer is located inside the vacuum chamber, blocking from the inner chamber first inner optical window spurious polarization introduced into the light admitted by the optical entrance window by a stress on the optical entrance window that results from a pressure difference between the vacuum pressure in the vacuum chamber and a pressure outside the vacuum chamber.

23. An apparatus for wide-angle narrowband filtering of optical energy, comprising:

a central optical axis extending left to right;

a magnet that produces a magnetic field;

a vapor chamber having an input window and an output window and enclosing a metal vapor, the metal vapor including a polarization changing material tat, when subjected to the magnetic field, changes polarization for a narrow wavelength bandwidth on the order of about $0.01 \times 10^{-9}$ that overlaps an optical wavelength associated wit a local minimum in intensity of a daylight spectrum and overlaps an optical wavelength associated wit a relatively high intensity in a combustion spectrum;

a heater tat heats the vapor chamber input and output windows;

a vacuum chamber, having an input window and an output window, tat encloses the vapor chamber so as to shut in the vapor chamber all around;

a first polarizer, inside the vacuum chamber, to determine a first polarization of light transmitted there-though; and a second polarizer oriented to substantively block light having the first polarization;

wherein the vacuum chamber input window, the first polarizer, the vapor chamber input window, the vapor chamber output window, the second polarizer, and the vacuum chamber output window are arranged along the optical axis in that order from left to right, so that the optical energy traverses the windows and polarizers in that order; and wherein the first polarizer is located inside the vacuum chamber, blocking from the vapor chamber input window spurious polarization introduced into the light traversing the vacuum chamber input window by a stress thereon that results from a pressure difference between a vacuum pressure in the vacuum chamber and a pressure outside the vacuum chamber.

\* \* \* \* \*